(12) United States Patent
Philbrick et al.

(10) Patent No.: US 7,543,087 B2
(45) Date of Patent: Jun. 2, 2009

(54) FREEING TRANSMIT MEMORY ON A NETWORK INTERFACE DEVICE PRIOR TO RECEIVING AN ACKNOWLEDGEMENT THAT TRANSMIT DATA HAS BEEN RECEIVED BY A REMOTE DEVICE

(75) Inventors: Clive M. Philbrick, San Jose, CA (US); Peter K. Craft, San Francisco, CA (US)

(73) Assignee: Alacritech, Inc., San Jose, CA (US)

( * ) Notice: Subject to any disclaimer, the term of this patent is extended or adjusted under 35 U.S.C. 154(b) by 1067 days.

(21) Appl. No.: 10/413,256

(22) Filed: Apr. 14, 2003

(65) Prior Publication Data

US 2003/0200284 A1 Oct. 23, 2003

Related U.S. Application Data

(60) Provisional application No. 60/374,788, filed on Apr. 22, 2002.

(51) Int. Cl.
*G06F 15/16* (2006.01)
*G06F 13/00* (2006.01)

(52) U.S. Cl. .............. 710/33; 710/5; 710/35; 709/201; 709/202; 709/208; 709/100; 707/10

(58) Field of Classification Search .......... 710/5, 710/33, 35; 709/202, 208, 201, 100; 707/10
See application file for complete search history.

(56) References Cited

U.S. PATENT DOCUMENTS

| 4,366,538 A | 12/1982 | Johnson et al. | 364/200 |
| 4,485,455 A | 11/1984 | Boone et al. | 364/900 |
| 4,485,460 A | 11/1984 | Stambaugh | 365/203 |

(Continued)

FOREIGN PATENT DOCUMENTS

WO WO 98/19412 5/1998

(Continued)

OTHER PUBLICATIONS

Internet pages entitled "Hardware Assisted Protocol Processing", (which Eugene Feinber is working on), 1 page, printed Nov. 25, 1998.

(Continued)

*Primary Examiner*—Tammara Peyton
(74) *Attorney, Agent, or Firm*—Silicon Edge Law Group, LLP; Mark Lauer (57) ABSTRACT

A transmit offload engine (TOE) such as an intelligent network interface device (INIC), video controller or host bus adapter (HBA) that can communicate data over transport protocols such as Transport Control Protocol (TCP) for a host. Such a device can send and receive data for the host to and from a remote host, over a TCP connection maintained by the device. For sending data, the device can indicate to the host that data has been transmitted from the device to a network, prior to receiving, by the device from the network, an acknowledgement (ACK) for all the data, accelerating data transmission. The greatest sequence number for which all previous bytes have been ACKed can be provided with a response to a subsequent command, with the host maintaining a table of ACK values to complete commands when appropriate.

31 Claims, 4 Drawing Sheets

U.S. PATENT DOCUMENTS

| | | | | |
|---|---|---|---|---|
| 4,589,063 A | 5/1986 | Shah et al. ................. 710/8 |
| 4,700,185 A | 10/1987 | Balph et al. ................ 370/451 |
| 4,991,133 A | 2/1991 | Davis et al. ................ 364/900 |
| 5,056,058 A | 10/1991 | Hirata et al. ................ 709/230 |
| 5,058,110 A | 10/1991 | Beach et al. ................ 370/85.6 |
| 5,097,442 A | 3/1992 | Ward et al. ................ 365/78 |
| 5,163,131 A | 11/1992 | Row et al. ................ 365/200 |
| 5,212,778 A | 5/1993 | Dally et al. ................ 395/400 |
| 5,280,477 A | 1/1994 | Trapp ................ 370/85.1 |
| 5,289,580 A | 2/1994 | Latif et al. ................ 395/275 |
| 5,299,312 A | 3/1994 | Rocco, Jr. ................ 714/4 |
| 5,303,344 A | 4/1994 | Yokoyama et al. ........ 395/200 |
| 5,321,819 A | 6/1994 | Szczepanek ................ 709/228 |
| 5,361,372 A | 11/1994 | Rege et al. ................ 709/234 |
| 5,410,546 A | 4/1995 | Boyer et al. ................ 714/763 |
| 5,412,782 A | 5/1995 | Hausman et al. ........... 395/250 |
| 5,418,912 A | 5/1995 | Christenson ................ 709/234 |
| 5,448,566 A | 9/1995 | Richter et al. ................ 370/94.1 |
| 5,485,455 A | 1/1996 | Dobbins et al. ............. 370/255 |
| 5,485,460 A | 1/1996 | Schrier et al. ................ 703/27 |
| 5,485,579 A | 1/1996 | Hitz et al. ................ 395/200.12 |
| 5,506,966 A | 4/1996 | Ban ................ 395/250 |
| 5,511,169 A | 4/1996 | Suda ................ 395/280 |
| 5,517,668 A | 5/1996 | Szwerinski et al. ........ 395/800 |
| 5,524,250 A | 6/1996 | Chesson et al. ............. 395/775 |
| 5,528,835 A | 6/1996 | Ra ................ 30/386 |
| 5,535,375 A | 7/1996 | Eshel ................ 703/27 |
| 5,548,587 A | 8/1996 | Bailey et al. ................ 370/395.7 |
| 5,548,730 A | 8/1996 | Young et al. ................ 395/280 |
| 5,566,170 A | 10/1996 | Bakke et al. |
| 5,574,919 A | 11/1996 | Netravali et al. ............ 712/220 |
| 5,588,121 A | 12/1996 | Reddin et al. ......... 395/200.15 |
| 5,590,328 A | 12/1996 | Seno et al. ................ 395/675 |
| 5,592,622 A | 1/1997 | Isfeld et al. ............. 395/200.02 |
| 5,596,574 A | 1/1997 | Perlman et al. ................ 370/389 |
| 5,613,071 A * | 3/1997 | Rankin et al. ................ 707/10 |
| 5,619,650 A | 4/1997 | Bach et al. ............. 395/200.01 |
| 5,629,933 A | 5/1997 | Delp et al. ................ 370/411 |
| 5,633,780 A | 5/1997 | Cronin ................ 361/220 |
| 5,634,099 A | 5/1997 | Andrews et al. ........ 395/200.07 |
| 5,634,127 A | 5/1997 | Cloud et al. ................ 395/680 |
| 5,642,482 A | 6/1997 | Pardillos ................ 395/200.2 |
| 5,664,114 A | 9/1997 | Krech, Jr. et al. ......... 395/200.64 |
| 5,671,355 A | 9/1997 | Collins ................ 395/200.2 |
| 5,678,060 A | 10/1997 | Yokoyama et al. .......... 709/212 |
| 5,682,534 A | 10/1997 | Kapoor et al. ............ 709/203 |
| 5,692,130 A | 11/1997 | Shobu et al. ........... 395/200.12 |
| 5,699,317 A | 12/1997 | Sartore et al. ............ 395/230.06 |
| 5,699,350 A | 12/1997 | Kraslavsky ................ 370/254 |
| 5,701,434 A | 12/1997 | Nakagawa ................ 395/484 |
| 5,701,516 A | 12/1997 | Cheng et al. ................ 395/842 |
| 5,708,779 A | 1/1998 | Graziano et al. ............ 709/250 |
| 5,717,691 A | 2/1998 | Dighe et al. ................ 370/401 |
| 5,727,142 A | 3/1998 | Chen ................ 395/181 |
| 5,742,765 A | 4/1998 | Wong et al. ................ 709/230 |
| 5,749,095 A | 5/1998 | Hagersten ................ 711/141 |
| 5,751,715 A | 5/1998 | Chan et al. ................ 370/455 |
| 5,752,078 A | 5/1998 | Delp et al. ................ 395/827 |
| 5,758,084 A | 5/1998 | Silverstein et al. ...... 395/200.58 |
| 5,758,089 A | 5/1998 | Gentry et al. ........... 395/200.64 |
| 5,758,186 A | 5/1998 | Hamilton et al. ............ 395/831 |
| 5,758,194 A | 5/1998 | Kuzma ................ 395/886 |
| 5,768,618 A | 6/1998 | Erickson et al. ................ 710/9 |
| 5,771,349 A | 6/1998 | Picazo, Jr. et al. ...... 395/188.01 |
| 5,774,660 A | 6/1998 | Brendel et al. ........... 395/200.31 |
| 5,778,013 A | 7/1998 | Jedwab ................ 714/807 |
| 5,778,419 A | 7/1998 | Hansen et al. ................ 711/112 |
| 5,790,804 A | 8/1998 | Osborne ................ 709/245 |
| 5,794,061 A | 8/1998 | Hansen et al. ........... 395/800.01 |
| 5,802,258 A | 9/1998 | Chen ................ 395/182.08 |
| 5,802,278 A | 9/1998 | Isfeld et al. ................ 709/249 |
| 5,802,580 A | 9/1998 | McAlpine ................ 711/149 |
| 5,809,328 A | 9/1998 | Nogales et al. ............. 395/825 |
| 5,809,527 A | 9/1998 | Cooper et al. ................ 711/133 |
| 5,812,775 A | 9/1998 | Van Seeters et al. ... 395/200.43 |
| 5,815,646 A | 9/1998 | Purcell et al. ................ 395/163 |
| 5,828,835 A | 10/1998 | Isfeld et al. ................ 709/200 |
| 5,848,293 A | 12/1998 | Gentry ................ 710/5 |
| 5,872,919 A | 2/1999 | Wakeland ................ 709/230 |
| 5,878,225 A | 3/1999 | Bilansky et al. ........ 395/200.57 |
| 5,892,903 A | 4/1999 | Klaus ................ 709/227 |
| 5,898,713 A | 4/1999 | Melzer et al. ................ 371/53 |
| 5,909,546 A | 6/1999 | Osborne ................ 709/212 |
| 5,913,028 A | 6/1999 | Wang et al. ........... 395/200.33 |
| 5,920,566 A | 7/1999 | Hendel et al. ................ 370/401 |
| 5,920,705 A | 7/1999 | Lyon et al. ................ 709/240 |
| 5,930,830 A | 7/1999 | Mendelson et al. ........ 711/171 |
| 5,931,918 A | 8/1999 | Row et al. ................ 709/300 |
| 5,935,205 A | 8/1999 | Murayama et al. ........ 709/216 |
| 5,937,169 A | 8/1999 | Connery et al. .......... 395/200.8 |
| 5,941,969 A | 8/1999 | Ram et al. ................ 710/128 |
| 5,941,972 A | 8/1999 | Hoese et al. ................ 710/129 |
| 5,950,203 A | 9/1999 | Stakuis et al. ................ 707/10 |
| 5,974,466 A | 10/1999 | Mizutani et al. ............ 709/236 |
| 5,987,022 A | 11/1999 | Geiger et al. ................ 370/349 |
| 5,991,299 A | 11/1999 | Radogna et al. ............ 370/392 |
| 5,996,013 A | 11/1999 | Delp et al. ................ 709/226 |
| 5,996,024 A | 11/1999 | Blumenau ................ 709/301 |
| 6,005,849 A | 12/1999 | Roach et al. ................ 370/276 |
| 6,009,478 A | 12/1999 | Panner et al. ................ 710/5 |
| 6,014,557 A * | 1/2000 | Morton et al. ................ 455/410 |
| 6,016,513 A | 1/2000 | Lowe ................ 709/250 |
| 6,021,446 A | 2/2000 | Gentry ................ 709/303 |
| 6,021,507 A | 2/2000 | Chen ................ 714/2 |
| 6,026,452 A | 2/2000 | Pitts ................ 710/56 |
| 6,034,963 A | 3/2000 | Minami et al. ................ 370/401 |
| 6,038,562 A | 3/2000 | Anjur et al. ................ 707/10 |
| 6,041,058 A | 3/2000 | Flanders et al. ................ 370/401 |
| 6,041,381 A | 3/2000 | Hoese ................ 710/129 |
| 6,044,438 A | 3/2000 | Olnowich ................ 711/130 |
| 6,047,323 A | 4/2000 | Krause ................ 709/227 |
| 6,047,356 A | 4/2000 | Anderson et al. ............ 711/129 |
| 6,049,528 A | 4/2000 | Hendel et al. ................ 370/235 |
| 6,049,808 A | 4/2000 | Talluri et al. ................ 707/201 |
| 6,057,863 A | 5/2000 | Olarig ................ 345/520 |
| 6,061,368 A | 5/2000 | Hitzelberger ................ 370/537 |
| 6,061,742 A | 5/2000 | Stewart et al. ................ 709/250 |
| 6,065,096 A | 5/2000 | Day et al. ................ 711/114 |
| 6,067,569 A | 5/2000 | Khaki et al. ................ 709/224 |
| 6,070,200 A | 5/2000 | Gates et al. ................ 710/20 |
| 6,078,564 A | 6/2000 | Lakshman et al. .......... 370/235 |
| 6,078,733 A | 6/2000 | Osborne ................ 709/250 |
| 6,094,712 A | 7/2000 | Follett et al. ................ 711/203 |
| 6,097,734 A | 8/2000 | Gotesman et al. ............ 370/474 |
| 6,101,555 A | 8/2000 | Goshey et al. ............... 709/321 |
| 6,111,673 A | 8/2000 | Chang et al. ................ 359/123 |
| 6,115,615 A | 9/2000 | Ota et al. ................ 455/422.1 |
| 6,122,670 A | 9/2000 | Bennett et al. |
| 6,141,701 A | 10/2000 | Whitney ................ 710/5 |
| 6,141,705 A | 10/2000 | Anand et al. ................ 710/15 |
| 6,145,017 A | 11/2000 | Ghaffari ................ 710/5 |
| 6,151,297 A | 11/2000 | Congdon et al. ............ 370/216 |
| 6,157,944 A * | 12/2000 | Pedersen |
| 6,157,955 A | 12/2000 | Narad et al. ................ 709/228 |
| 6,172,980 B1 | 1/2001 | Flanders et al. ............. 370/401 |
| 6,173,333 B1 | 1/2001 | Jolitz et al. |
| 6,181,705 B1 | 1/2001 | Branstad et al. ................ 370/412 |
| 6,195,739 B1 | 2/2001 | Wright et al. ................ 712/19 |
| 6,202,105 B1 | 3/2001 | Gates et al. ................ 710/20 |
| 6,208,651 B1 | 3/2001 | Van Renesse et al. ....... 370/392 |
| 6,226,680 B1 | 5/2001 | Boucher et al. ............. 709/230 |
| 6,233,242 B1 | 5/2001 | Mayer et al. ................ 370/392 |
| 6,246,683 B1 | 6/2001 | Connery et al. ............ 370/392 |
| 6,247,060 B1 | 6/2001 | Boucher et al. ............. 709/238 |

| | | | |
|---|---|---|---|
| 6,247,068 B1 | 6/2001 | Kyle | 719/328 |
| 6,279,051 B1 | 8/2001 | Gates et al. | 710/20 |
| 6,289,023 B1 | 9/2001 | Dowling et al. | 370/419 |
| 6,298,403 B1 | 10/2001 | Suri et al. | 710/100 |
| 6,314,525 B1 | 11/2001 | Mahalingham et al. | 714/4 |
| 6,324,649 B1 | 11/2001 | Eyres et al. | 713/202 |
| 6,334,153 B2 | 12/2001 | Boucher et al. | 709/230 |
| 6,343,345 B1 | 1/2002 | Hilla et al. | 711/138 |
| 6,343,360 B1 | 1/2002 | Feinleib | 713/1 |
| 6,345,301 B1 | 2/2002 | Burns et al. | 709/230 |
| 6,345,302 B1 | 2/2002 | Bennett et al. | 709/236 |
| 6,356,951 B1 | 3/2002 | Gentry, Jr. | 709/250 |
| 6,359,882 B1 * | 3/2002 | Robles et al. | 370/389 |
| 6,370,599 B1 | 4/2002 | Anand et al. | 710/15 |
| 6,385,647 B1 | 5/2002 | Willis et al. | 709/217 |
| 6,389,468 B1 | 5/2002 | Muller et al. | 709/226 |
| 6,389,479 B1 | 5/2002 | Boucher et al. | 709/243 |
| 6,393,487 B2 | 5/2002 | Boucher et al. | 709/238 |
| 6,405,237 B1 | 6/2002 | Khalidi et al. | 709/203 |
| 6,421,742 B1 | 7/2002 | Tillier | 710/1 |
| 6,421,753 B1 | 7/2002 | Hoese et al. | 710/315 |
| 6,427,169 B1 | 7/2002 | Elzur | 709/224 |
| 6,427,171 B1 | 7/2002 | Craft et al. | 709/230 |
| 6,427,173 B1 | 7/2002 | Boucher et al. | 709/238 |
| 6,434,620 B1 | 8/2002 | Boucher et al. | 709/230 |
| 6,434,651 B1 | 8/2002 | Gentry, Jr. | 710/260 |
| 6,449,656 B1 | 9/2002 | Elzur et al. | 709/236 |
| 6,453,360 B1 | 9/2002 | Muller et al. | 709/250 |
| 6,470,382 B1 | 10/2002 | Wang et al. | 709/220 |
| 6,470,397 B1 | 10/2002 | Shah et al. | 709/250 |
| 6,470,415 B1 | 10/2002 | Starr et al. | 711/104 |
| 6,473,425 B1 | 10/2002 | Bellaton et al. | 370/392 |
| 6,473,788 B1 | 10/2002 | Kim et al. | 709/209 |
| 6,480,489 B1 | 11/2002 | Muller et al. | 370/389 |
| 6,487,202 B1 | 11/2002 | Klausmeier et al. | 370/395.1 |
| 6,487,654 B2 | 11/2002 | Dowling | |
| 6,490,631 B1 | 12/2002 | Teich et al. | 709/250 |
| 6,502,144 B1 | 12/2002 | Accarie | 710/8 |
| 6,512,774 B1 | 1/2003 | Vepa et al. | 370/401 |
| 6,523,119 B2 | 2/2003 | Pavlin et al. | 713/192 |
| 6,526,446 B1 | 2/2003 | Yang et al. | 709/230 |
| 6,536,000 B1 * | 3/2003 | Jackson et al. | 714/57 |
| 6,567,377 B1 | 5/2003 | Vepa et al. | 370/230 |
| 6,570,884 B1 | 5/2003 | Connery et al. | 370/419 |
| 6,587,438 B1 | 7/2003 | Brendel | 370/238 |
| 6,591,302 B2 | 7/2003 | Boucher et al. | 709/230 |
| 6,591,310 B1 | 7/2003 | Johnson | 710/3 |
| 6,648,611 B2 | 11/2003 | Morse et al. | 417/310 |
| 6,650,640 B1 | 11/2003 | Muller et al. | 370/392 |
| 6,657,757 B1 | 12/2003 | Chang et al. | 359/124 |
| 6,658,480 B2 | 12/2003 | Boucher et al. | 709/230 |
| 6,678,283 B1 | 1/2004 | Teplitsky | 370/463 |
| 6,681,364 B1 | 1/2004 | Calvignac et al. | |
| 6,687,758 B2 | 2/2004 | Craft et al. | 709/250 |
| 6,697,868 B2 | 2/2004 | Craft et al. | 709/230 |
| 6,751,665 B2 | 6/2004 | Philbrick et al. | 709/224 |
| 6,757,746 B2 | 6/2004 | Boucher et al. | 709/250 |
| 6,765,901 B1 | 7/2004 | Johnson et al. | 370/352 |
| 6,807,581 B1 | 10/2004 | Starr et al. | 709/250 |
| 6,842,896 B1 | 1/2005 | Redding et al. | 717/172 |
| 6,910,062 B2 * | 6/2005 | Arimilli et al. | 709/202 |
| 6,912,522 B2 | 6/2005 | Edgar | |
| 6,938,092 B2 | 8/2005 | Burns | 709/230 |
| 6,941,386 B2 | 9/2005 | Craft et al. | 709/250 |
| 6,965,941 B2 | 11/2005 | Boucher et al. | 709/230 |
| 6,996,070 B2 | 2/2006 | Starr et al. | 370/252 |
| 7,042,898 B2 | 5/2006 | Blightman et al. | 370/463 |
| 7,076,568 B2 | 7/2006 | Philbrick et al. | 709/250 |
| 7,089,326 B2 | 8/2006 | Boucher et al. | 709/242 |
| 7,093,099 B2 | 8/2006 | Bodas et al. | 711/206 |
| 7,124,205 B2 | 10/2006 | Craft et al. | 709/250 |
| 7,133,940 B2 | 11/2006 | Blightman et al. | 710/22 |
| 7,167,926 B1 | 1/2007 | Boucher et al. | 709/250 |
| 7,167,927 B2 | 1/2007 | Philbrick et al. | 709/250 |
| 7,174,393 B2 | 2/2007 | Boucher et al. | 709/250 |
| 7,185,266 B2 | 2/2007 | Blightman et al. | 714/776 |
| 7,191,241 B2 | 3/2007 | Boucher et al. | 709/230 |
| 7,191,318 B2 | 3/2007 | Tripathy et al. | 712/225 |
| 7,237,036 B2 | 6/2007 | Boucher et al. | 709/245 |
| 7,254,696 B2 | 8/2007 | Mittal et al. | 712/210 |
| 7,284,070 B2 | 10/2007 | Boucher et al. | 709/250 |
| 2001/0004354 A1 | 6/2001 | Jolitz | |
| 2001/0013059 A1 | 8/2001 | Dawson et al. | |
| 2001/0014892 A1 | 8/2001 | Gaither et al. | |
| 2001/0014954 A1 | 8/2001 | Purcell et al. | |
| 2001/0025315 A1 | 9/2001 | Jolitz | |
| 2001/0048681 A1 | 12/2001 | Bilic et al. | |
| 2001/0053148 A1 | 12/2001 | Bilic et al. | |
| 2002/0073223 A1 | 6/2002 | Darnell et al. | 709/232 |
| 2002/0112175 A1 | 8/2002 | Makofka et al. | 713/200 |
| 2003/0014544 A1 | 1/2003 | Pettey | 709/249 |
| 2003/0066011 A1 | 4/2003 | Oren | |
| 2003/0110344 A1 | 6/2003 | Szczepanek et al. | 711/100 |
| 2003/0149715 A1 * | 8/2003 | Ruutu et al. | 709/100 |
| 2003/0165160 A1 | 9/2003 | Minami et al. | |
| 2004/0042464 A1 | 3/2004 | Elzur et al. | 370/395.52 |
| 2004/0049727 A1 | 3/2004 | Wang | 714/766 |
| 2004/0054814 A1 | 3/2004 | McDaniel | |
| 2004/0059926 A1 | 3/2004 | Angelo et al. | 713/168 |
| 2004/0125751 A1 | 7/2004 | Vangal et al. | 370/252 |
| 2004/0153578 A1 | 8/2004 | Elzur | |
| 2004/0158640 A1 | 8/2004 | Philbrick et al. | 709/230 |
| 2004/0193733 A1 | 9/2004 | Vangal et al. | 709/250 |
| 2004/0213290 A1 | 10/2004 | Johnson et al. | 370/469 |
| 2004/0246974 A1 | 12/2004 | Gyugyi et al. | 370/395.31 |
| 2004/0249998 A1 | 12/2004 | Rajagopalan et al. | 710/30 |
| 2006/0248208 A1 | 11/2006 | Walbeck et al. | 709/230 |

FOREIGN PATENT DOCUMENTS

| | | |
|---|---|---|
| WO | WO 98/50852 | 11/1998 |
| WO | WO 99/04343 | 1/1999 |
| WO | WO 99/65219 | 12/1999 |
| WO | WO 00/13091 | 3/2000 |
| WO | WO 01/04770 | 1/2001 |
| WO | WO 01/05107 | 1/2001 |
| WO | WO 01/05116 | 1/2001 |
| WO | WO 01/05123 | 1/2001 |
| WO | WO 01/40960 | 6/2001 |
| WO | WO 01/59966 | 8/2001 |
| WO | WO 01/86430 | 11/2001 |

OTHER PUBLICATIONS

Zilog product Brief entitled "Z85C30 CMOS SCC Serial Communication Controller", Zilog Inc., 3 pages, 1997.
Internet pages of Xpoint Technologies, Inc. entitled "Smart LAN Work Requests", 5 pages, printed Dec. 19, 1997.
Internet pages entitled: Asante and 100BASE-T Fast Ethernet. 7 pages, printed May 27, 1997.
Internet pages entitled: A Guide to the Paragon XP/S-A7 Supercomputer at Indiana University, 13 pages, printed Dec. 21, 1998.
Richard Stevens, "TCP/IP Illustrated, vol. 1, The Protocols", pp. 325-326 (1994).
Internet pages entitled: Northridge/Southbridge vs. Intel Hub Architecture, 4 pages, printed Feb. 19, 2001.
Gigabit Ethernet Technical Brief, Achieving End-to-End Performance. Alteon Networks, Inc., First Edition, Sep. 1996, 15 pages.
Internet pages directed to Technical Brief on Alteon Ethernet Gigabit NIC technology, www.alteon.com; 14 pages, printed Mar. 15, 1997.
VIA Technologies, Inc. article entitled "VT8501 Apollo MVP4", pp. i-iv, 1-11, cover and copyright page, revision 1.3, Feb. 1, 2000.
iReady News Archives article entitled "iReady Rounding Out Management Team with Two Key Executives", http://www.ireadyco.com/archives/keyexec.html, 2 pages, printed Nov. 28, 1998.

"Toshiba Delivers First Chips to Make Consumer Devices Internet-Ready Based On iReady's Design," Press Release Oct. 1998, 3 pages, printed Nov. 28, 1998.

Internet pages from iReady Products, web site http://www.ireadyco.com/products,html, 2 pages, downloaded Nov. 25, 1998.

iReady News Archives, Toshiba, iReady shipping Internet chip, 1 page, printed Nov. 25, 1998.

Interprophet article entitled "Technology", http://www.interprophet.com/technology.html 17 pages, printed Mar. 1, 2000.

iReady Corporation, article entitled "The I-1000 Internet Tuner", 2 pages, dated unknown.

iReady article entitled "About Us Introduction", Internet pages from http://www.iReadyco.com/about.html, 3 pages, printed Nov. 25, 1998.

iReady News Archive article entitled "Revolutionary Approach to Consumer Electronics Internet Connectivity Funded", San Jose, CA, Nov. 20, 1997. 2 pages, printed Nov. 2, 1998.

iReady News Archive article entitled "Seiko Instruments Inc. (SII) Introduces World's First Internet-Ready Intelligent LCD Modules Based on iReady Technology," Santa Clara, CA and Chiba, Japan, Oct. 26, 1998. 2 pages, printed Nov. 2, 1998.

NEWSwatch article entitled "iReady internet Tuner to Web Enable Devices", Tuesday, Nov. 5, 1996, printed, Nov. 2, 1998, 2 pages.

EETimes article entitled "Tuner for Toshiba, Toshiba Taps iReady for Internet Tuner", by David Lammers, 2 pages, printed Nov. 2, 1998.

"Comparison of Novell Netware and TCP/IP Protocol Architectures", by J.S. Carbone, 19 pages, printed Apr. 10, 1998.

Adaptec article entitled "AEA-7110C-a DuraSAN product", 11 pages, printed Oct. 1, 2001.

iSCSI HBA article entitled "iSCSI and 2Gigabit fibre Channel Host Bus Adapters from Emulex, QLogic, Adaptec, JNI", 8 pages, printed Oct. 1, 2001.

iSCSI HBA article entitled "FCE-3210/6410 32 and 64-bit PCI-to-Fibre Channel HBA", 6 pages, printed Oct. 1, 2001.

ISCSI.com article entitled "iSCSI Storage", 2 pages, printed Oct. 1, 2001.

"Two-Way TCP Traffic Over Rate Controlled Channels: Effects and Analysis"; by Kalampoukas et al., IEEE Transactions on Networking, vol. 6, No. 6, Dec. 1998, 17 pages.

IReady News article entitled "Toshiba Delivers First Chips to Make Consumer Devices Internet-Ready Based on iReadu Design", Santa Clara, CA, and Tokyo, Japan, Oct. 14, 1998, printed Nov. 2, 1998, 3 pages.

Internet pages of InterProphet entitled "Frequently Asked Questions", by Lynne Jolitz, printed Jun. 14, 2000, 4 pages.

"File System Design For An NFS File Server Appliance", Article by D. Hitz, et al, 13 pages.

Adaptec Pres Release article entitled "Adaptec Announces EtherStorage Technology", 2 pages, May 4, 2000, printed Jun. 14, 2000.

Adaptec article entitled "EtherStorage Frequently Asked Questions", 5 pages, printed Jul. 19, 2000.

Adaptec article entitled "EtherStorage White Paper", 7 pages, printed Jul. 19, 2000.

CIBC World Markets article entitled "Computers; Storage", by J. Berlino et al., 9 pages, dated Aug. 7, 2000.

Merrill Lynch article entitled "Storage Futures", by S. Milunovich, 22 pages, dated May 10, 2000.

CBS Market Watch article entitled "Montreal Start-Up Battles Data Storage Bottleneck", by S. Taylor, dated Mar. 5, 2000, 2 pages, printed Mar. 7, 2000.

Internet-draft article entitled "SCSI/TCP (SCSI over TCP)", by J. Satran et al., 38 pages dated Feb. 2000, printed May 19, 2000.

Internet pages entitled Technical White Paper-Xpoint's Disk to LAN Acceleration Solution for Windows NT Server, printed Jun. 5, 1997, 15 pages.

Jato Technologies article entitled Network Accelerator Chip Architecture, twelve-slide presentation, printed Aug. 19, 1998, 13 pages.

EETimes article entitled Enterprise System Uses Flexible Spec, dated Aug. 10, 1998, printed Nov. 25, 1998, 3 pages.

Internet pages entitled "Smart Ethernet Network Interface Cards", which Berend Ozceri is developing, printed Nov. 25, 1998, 2 pages.

Internet pages of Xaqti corporation "GigaPower Protocol Processor Product Review," printed Nov. 25, 1999, 4 pages.

Internet pages entitled "DART: Fast Application Level Networking via Data-Copy Avoidance," by Robert J. Walsh, printed Jun. 3, 1999, 25 pages.

Schwaderer et al., IEEE Computer Society Press publication entitled, "XTP in VLSI Protocol Decomposition for ASIC Implementation", from 15th Conference on Local Computer Networks, 5 pages, Sep. 30-Oct. 3, 1990.

Beach, Bob, IEEE Computer Society Press publication entitled, "UltraNet: An Architecture for Gigabit Networking", from 15th Conference on Local Computer Networks, 18 pages, Sep. 30-Oct. 3, 1990.

Chesson et al., IEEE Syposium Record entitled, "The Protocol Engine Chipset", from Hot Chips III, 16 pages, Aug. 26-27, 1991.

Maclean et al., IEEE Global Telecommunications Conference, Globecom '91, presentation entitled, "An Outboard Processor for High Performance Implementation of Transport Layer Protocols", 7 pages, Dec. 2-5, 1991.

Ross et al., IEEE article entitled "FX1000: A high performance single chip Gigabit Ethernet NIC", from Compcon '97 Proceedings, 7 pages, Feb. 23-26, 1997.

Strayer et al., "Ch. 9: The Protocol Engine" from XTP: The Transfer Protocol, 12 pages, Jul. 1992.

Publication entitled "Protocol Engine Handbook", 44 pages, Oct. 1990.

Koufopavlou et al., IEEE Global Telecommunications Conference, Globecom '92, presentation entitled, "Parallel TCP for High Performance Communication Subsystems", 7 pages, Dec. 6-9, 1992.

Lilienkamp et al., Publication entitled "Proposed Host-Front End Protocol", 56 pages, Dec. 1984.

Andrew S. Tanenbaum, Computer Networks, Third Edition, 1996, ISBN 0-13-349945-6.

Rice University article entitled "LRP: A Network Subsystem Architecture for Server Systems", by P. Druschel and G. Banga, 14 pages.

Internet RFC/STD/FYI/BCP Archives article with heading "RFC2140" entitled "TCP Control Block Interdependence", web address http://www.faqs.org/ftp/rfc/pdf/rfc2140.txt.pdf, 11 pages, Apr. 1997.

WindRiver article entitled "Tornado: For Intelligent Network Acceleration", copyright Wind River Systems, 2001, 2 pages.

WindRiver White Paper entitled "Complete TCP/IP Offload for High-Speed Ethernet Networks", Copyright Wind River Systems, 2002, 7 pages.

Intel article entitled "Solving Server Bottlenecks with Intel Server Adapters", Copyright Intel Corporation, 1999, 8 pages.

Thia, Y.H. Publication entitled "High-Speed OSI Protocol Bypass Algorithm with Window Flow Control", *Protocols for High Speed Networks*, pp. 53-68, 1993.

U.S. Provisional Appl. No. 60/053,240, Titled: TCP/IP Network Accelerator and Method of Use, filed Jul. 18, 1997, Inventors: Jolitz et al., Assignee: InterProphet LLC.

Thia, Y.H. Publication entitled "A Reduced Operational Protocol Engine (ROPE) for a multiple-layer bypass architecture", *Protocols for High Speed Networks*, pp. 224-239, 1995.

Form 10-K for Excelan, Inc., for the fiscal year ending Dec. 31, 1987 (10 pages).

Form 10-K for Excelan, Inc., for the fiscal year ending Dec. 31, 1998 (10 pages).

Touch, J., "Request for Comments 2140: TCP Control Block Interdependence", Apr. 2007.

Willmann et al., "An Efficient Programmable 10 Gigabit Ethernet Network Interface" The international Symposium on High-Performance, http://www.ece.rice.edu/~willmann/pubs/willmannp_ethernet.pdf, Dec. 2004.

Mackenzie et al., "An Intel IXP 1200-Based Network Interface", http://.www.cc.gatech.edu/~kenmac/asan/asan-san-2.pdf.

Form 10-K for Exelan, Inc., for the fiscal year ending Dec. 31, 1987 (10 pages).

Form 10-K for Exelan, Inc., for the fiscal year ending Dec. 31, 1988 (10 pages).

* cited by examiner

FREEING TRANSMIT MEMORY ON A NETWORK INTERFACE DEVICE PRIOR TO RECEIVING AN ACKNOWLEDGEMENT THAT TRANSMIT DATA HAS BEEN RECEIVED BY A REMOTE DEVICE

CROSS-REFERENCE TO RELATED APPLICATION

The present application claims priority under 35 U.S.C. §119(e) to Provisional Patent Application Ser. No. 60/374,788, filed Apr. 22, 2002, entitled "TCP/IP Offload Device," which is incorporated by reference herein.

REFERENCE TO CD APPENDIX

The Compact Disc Appendix, which is a part of the present disclosure, includes two copies of a recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BACKGROUND

The present invention relates to computer and other networking, particularly devices that can communicate over a network using Transport Control Protocol (TCP) over Internet Protocol (IP). Recent advances in this area include intelligent network interface hardware and software that has been developed by Alacritech, Inc. to work with a host computer. Detailed descriptions of such advances, as well as relevant claims, can be found in U.S. Pat. No. 6,226,680, U.S. Pat. No. 6,226,680, U.S. Pat. No. 6,247,060, U.S. Pat. No. 6,334,153, U.S. Pat. No. 6,389,479, U.S. Pat. No. 6,393,487, U.S. Pat. No. 6,427,171, U.S. Pat. No. 6,427,173, U.S. Pat. No. 6,434,620 and U.S. Pat. No. 6,470,415, which are incorporated by reference herein.

For example, in one embodiment multiple TCP connections can be passed from a host computer to an intelligent network interface card (INIC) that is coupled to the host computer, offloading the TCP processing from the host to the card for these connections. A host can be a computer that acts as a source of information or signals. The term can refer to almost any kind of computer, from a centralized mainframe that is a host to its terminals, to a server that is host to its clients, to a desktop PC that is host to its peripherals. In network architectures, a client station (user's machine) may be considered a host, and an adapter that terminates TCP may also be considered a host, because each is a source of information to the network in contrast to a device such as a router or switch that merely directs traffic at the IP level.

For an INIC to be cost-effective, its processing power and memory capacity may be less than that of the host computer, although the INIC may also be more efficient than the host at certain tasks. TCP protocol guarantees reliable delivery of data, however, requiring thousands of lines of instruction code to ensure that the data is accurately and completely transferred over the network from a source in one host to a destination in another host. For this reason, the host may establish the TCP connections and retain a fallback capability for error handling of messages that are otherwise processed by a fast-path provided by the INIC.

One way that TCP guarantees delivery of data is through the use of acknowledgments (ACKs) and the sequenced delivery of the data. That is, after data has been sent in sequential packets, ACKs are returned from the receiving host indicating that all bytes up to a certain sequence number have been received. As shown in the prior art diagram of FIG. 1, to transmit data corresponding to a TCP connection from a local host having an attached INIC to a remote host over a network, the local host first sends 20 to the INIC a command to transmit the data. The INIC then 22 acquires the data, divides it into segments and adds TCP and IP headers to each data segment to create a TCP/IP packet corresponding to each segment. Next, the INIC transmits 24 the resulting packets onto the network. After the remote host has received and validated the packets, the remote host sends ACKs back to the local host indicating how much of the data has been successfully received.

Figure 1:
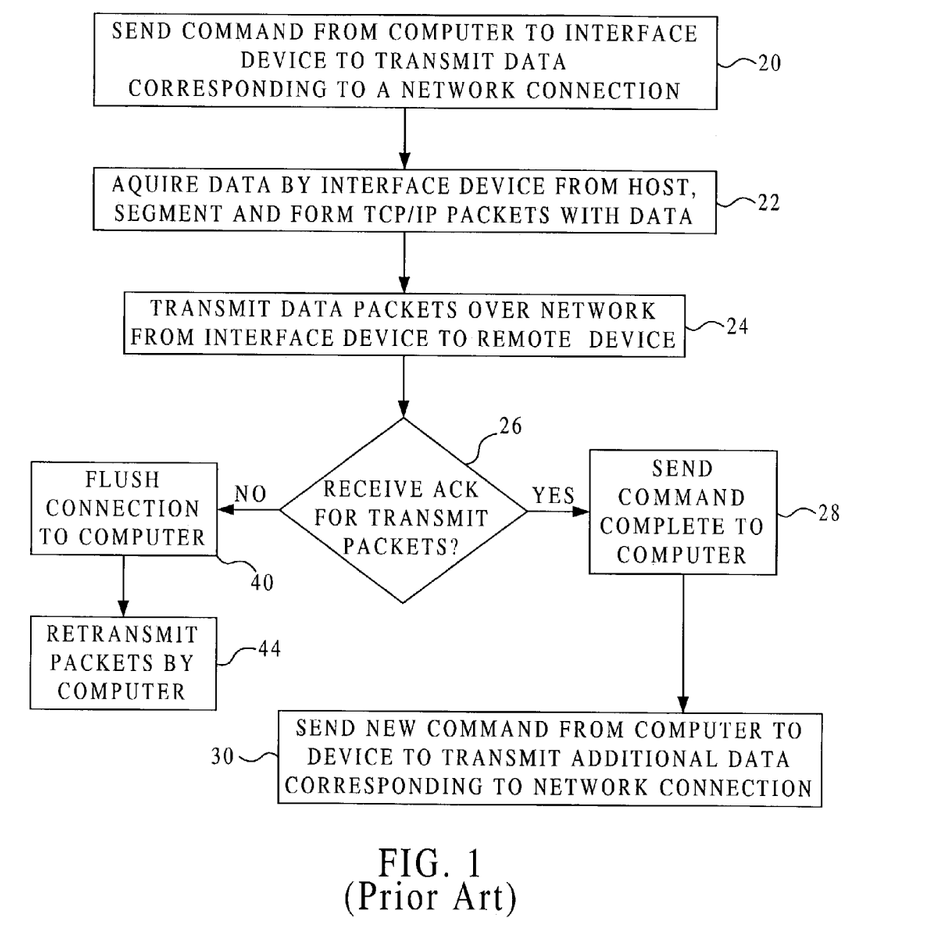
FIG. 1 is a schematic diagram of a prior art method for transmitting data from a host with an interface device.

Upon receiving an ACK 26 for all the transmitted data, the INIC sends a command complete 28 to the local host indicating that the transmit command has been completed by the transport function of the INIC, and an upper layer such as a session layer of the host is informed that its request to transmit data has been completed. For the case in which an ACK is not received by the INIC within a predetermined time after the corresponding packets were sent, indicating an error condition, the TCP connection is flushed 40 from the INIC to the host. The host can then retransmit 44 some or all of the unacknowledged packets.

SUMMARY

It was discovered by the present inventors that waiting for ACKs to be received by an interface device for a host computer before signaling to the host that transmit commands have been completed can cause delays in transmitting data. In one embodiment of the present disclosure this problem is solved by sending, from the device to the host, a signal that the data has been sent from the device to the network, prior to receiving, by the device from the network, an ACK that all the data has been received. This brief summary does not purport to define the invention, which is instead defined in the claims below.

DETAILED DESCRIPTION OF THE PREFERRED EMBODIMENT

Figure 2:
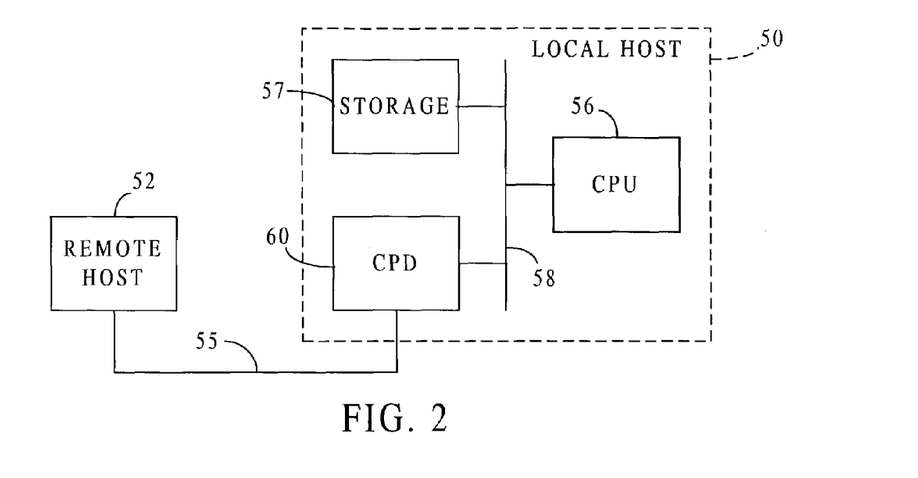
FIG. 2 is a schematic diagram of a system including a local host that is coupled to a remote host over a network.

FIG. 2 shows a schematic diagram of a system including a local host 50 that is coupled to a remote host 52 over a network 55. The local host 50 has a central processing unit
}

(CPU) 56 that can access host storage 57 via host bus 58. A network interface device such as a communication processing device (CPD) 57 is integrated into the local host 50 to facilitate communication with the network. The local host 50 may be a client or server station that runs applications as well as communicating over the network 55. The local host 50 may instead be a peripheral unit such as an adapter for such a client or server station, with the peripheral unit terminating transport level protocols such as TCP.

Figure 3:
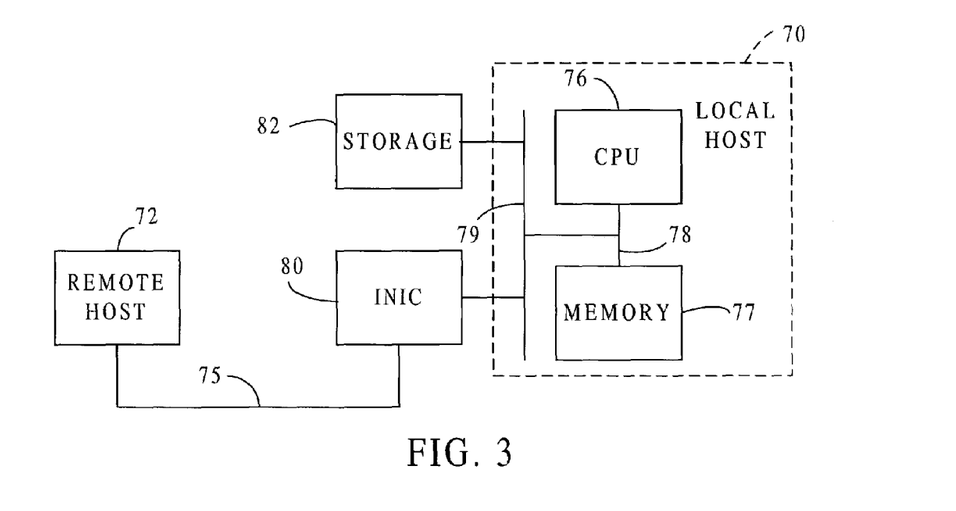
FIG. 3 is a schematic diagram of system including a local host that is coupled to a remote host over a network via a network interface device.

FIG. 3 shows a schematic diagram of another system including a local host 70 that is coupled to a remote host 72 over a network 75. The local host 70 has a CPU 76 that can access host memory 77 via memory bus 78. A peripheral component interconnect (PCI) bus 79 couples host 70 to storage 82. A network interface device such as INIC 80 is coupled between the PCI bus 79 and the network 75. Although described as an INIC in this embodiment, one should realize that the network interface device can take the form of a storage interface such as a host bus adapter (HBA), for example an interface that processes Internet SCSI (iSCSI), or the network interface may be a video interface, an audio interface, or various other peripheral units.

Figure 4:
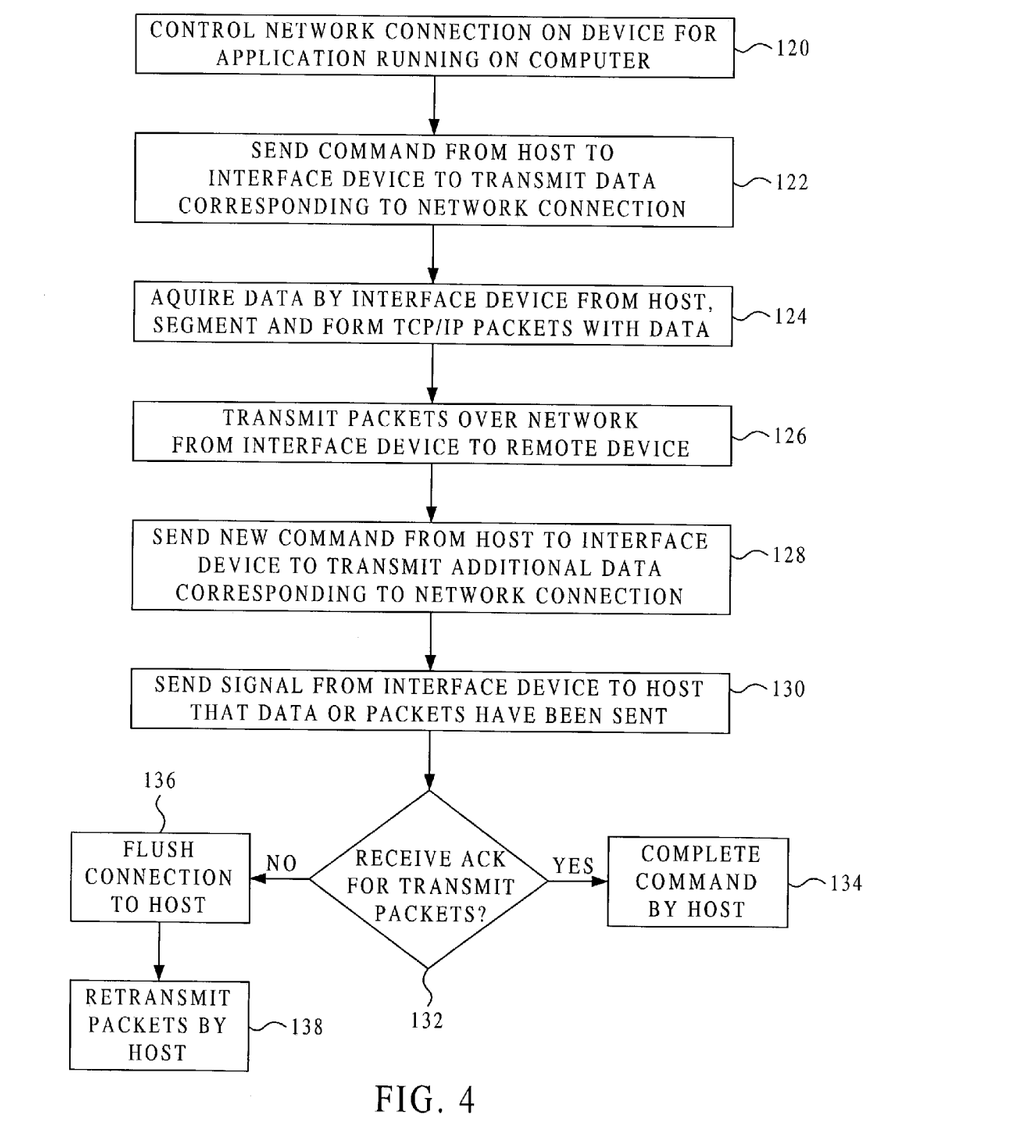
FIG. 4 is a schematic diagram of a method that can reduce delays in transmitting data from a host with an interface device.

FIG. 4 illustrates a method for transmitting data corresponding to a TCP connection from a local host to a remote host over a network. A network interface device is coupled between the local host and the network to facilitate network communication. According to one embodiment, the TCP connection has been established for an application running on the local host, with the TCP connection being controlled 120 by the interface device. The local host then sends 122 to the interface device a request or command to transmit data associated with the application. Responding to the command, the interface device acquires 124 the data, divides it into segments and adds TCP and IP headers to each data segment to create a TCP/IP packet corresponding to each segment. The interface device then transmits 126 the resulting packets onto the network.

After all the packets have been transmitted onto the network, the interface device sends a signal 130 to the host computer that the data or packets have been transmitted. The signal may be known as a command response, and may be triggered by the host sending to the interface device another command to transmit additional data corresponding to the TCP connection 128. The command response includes an indication of how much, if any, of the transmitted data has been acknowledged (ACKed) by the remote host. An indication that the interface device has received an ACK for a previous command may also be sent with or piggybacked on the command response.

For the specific example in which up to three transmit commands per connection (actually pointers to three commands) can be simultaneously stored on the interface device, when the host passes a third command to the card, the interface device will complete the first command back to the host as long as all the data for the first command has been sent. There may or may not be ACKed data in that command response, which is indicated in the SND_UNA (send unacknowledged) value. The SND_UNA value provides the sequence number beyond which the remote host has not acknowledged receipt of the data.

Upon receiving the signal that the data was sent, the host can send a yet another command to the interface device to transmit additional data. Relieving the interface device from the duty of maintaining the command until all the data for the command has been ACKed frees memory space on the interface device for storing another command, allowing the interface device to transmit more data. This is particularly useful for the situation in which the interface device has a limited amount of memory for storing commands, and that memory amount is exceeded by the outstanding commands for which an ACK has not yet been received.

The host then waits to receive from the interface device an indication that the ACK for the transmitted packets has been received 132. If the ACK indication is received, the host transport function marks the send command as having completed 134 and tells the layer that requested the command, typically a session or application layer, that its request to transmit the data corresponding to the command has been successfully completed. If the ACK is not received by the interface device within a predetermined time period, the interface device flushes the connection from the interface device to the host 136, and the host then retransmits the packets 138 for which an ACK was not received.

In one embodiment, the interface device caches thirty-two of the most active TCP connections in SRAM, while about four thousand TCP connections are maintained in DRAM. SRAM memory may be relatively expensive especially in terms of on-chip real estate, and therefore SRAM memory space may be relatively scarce. For each of the thirty-two active TCP connections in this embodiment, pointers to (also known as indications of) up to three transmit commands are stored: commands that have been sent, commands that are being sent, and commands that are to be sent. Once these three pointers or indications have been stored, that connection can not transmit any more data in this embodiment. Particularly for the situation in which a number of transmit commands are desired to be sent in a rapid sequence for a connection, waiting for an ACK to be returned corresponding to one of the commands can stall the transmission of data. This embodiment avoids that delay by freeing the SRAM that stores the command pointers or indications once the data has been sent and typically prior to receiving an ACK for all that data, while sending a signal to the host that the data has been sent.

The host can maintain in its short term memory a table of ACK values for each connection in host memory, the host memory typically being many times larger the SRAM on the interface device, so that delays in data transmission due to interface device waiting for commands to be ACKed are reduced. The host then is responsible for completing the command when the corresponding ACK indication has arrived at the host. The host can determine completion of the commands simply by calculating the sequence number for the last byte of data for a command, using the data length associated with the command and the starting sequence number of the command (or the ending sequence number of the prior command). This sequence number is compared with a SND_UNA field in each command response, thereby determining whether the command is completed. Completing the command includes providing by the transport layer, typically TCP, an indication to an upper layer such as a session layer or application layer, that the data associated with the command has been ACKed by the remote host.

Figure 5:
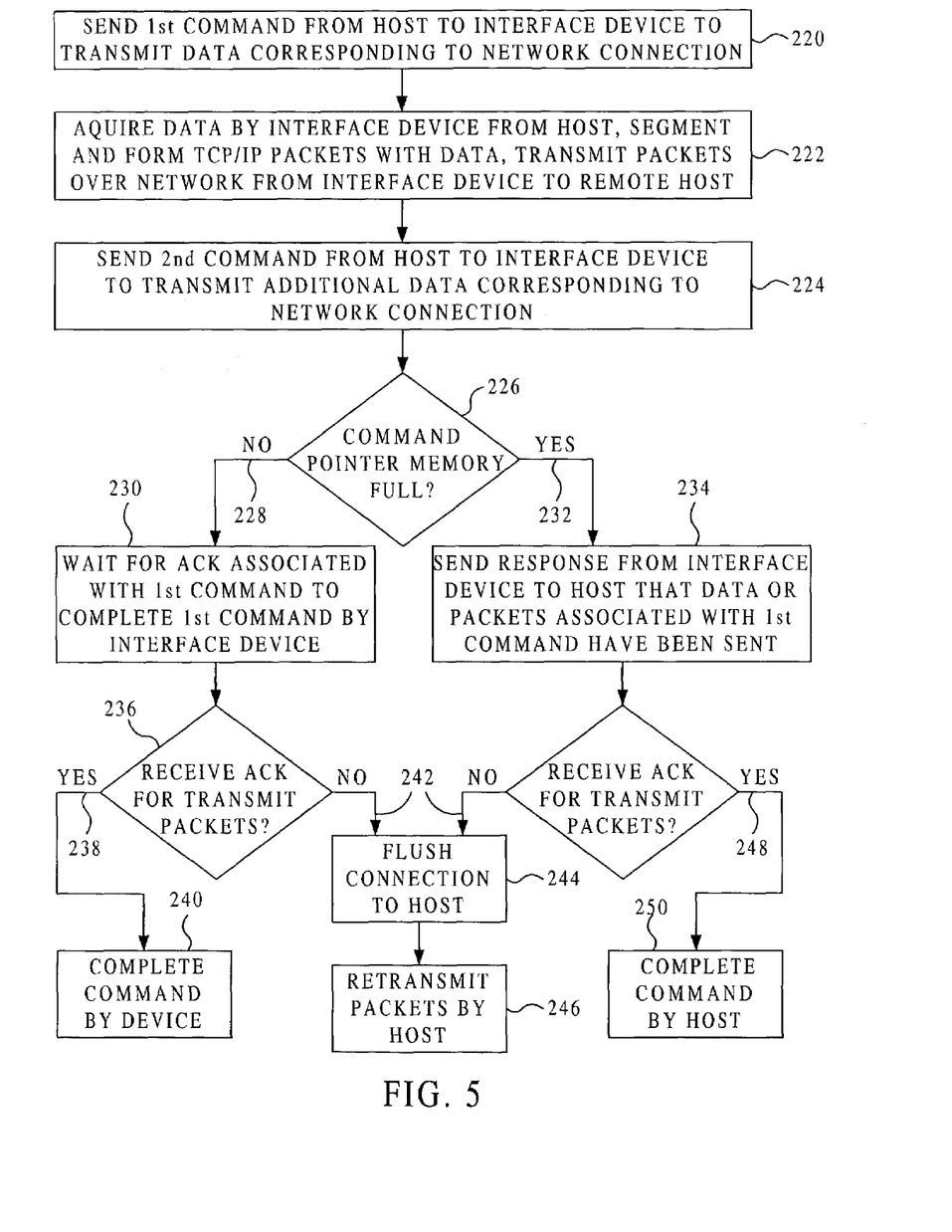
FIG. 5 is a schematic diagram of another method that can reduce delays in transmitting data from a host with an interface device.

FIG. 5 illustrates another method for transmitting data corresponding to a TCP connection from a local host to a remote host over a network. Much as before, a network interface device is coupled between the local host and the network to facilitate network communication. The TCP connection has been established for an application running on the local host, with the TCP connection being controlled by the interface device. The local host sends 220 to the interface device a first command to transmit data associated with the application. To accomplish this, the host writes a pointer for that command to a register on the interface device, with the command initially remaining on the host. The pointer may for example be 64 bits in length, whereas the command may be 512 bytes, most of those bytes serving as pointers (e.g., a scatter-gather list) to the data of the host that is to be transmitted. The command is then pulled into the interface device in pieces during execution of the command. Responding to the command, the interface device acquires the data, divides it into segments and adds TCP and IP headers to each data segment to create a TCP/IP packet corresponding to each segment and transmits the resulting packets onto the network 222.

The host then sends a second command 224 to the interface device to transmit additional data associated with the network connection. The interface device, upon receiving the second command from the host, determines whether the memory space for holding pointers to transmit commands for this connection is full. If not 228, the interface device continues to wait for ACKs associated with the first command to be returned to send a command complete response to the host 230. If, on the other hand, the interface device determines that the memory space for holding transmit command pointers is now full 232, the interface device sends a response to the first command indicating that the data associated with the first command has been sent. This command response includes an indication of how much, if any, of the transmitted data has been ACKed by the remote host 234. One should note that the interface device may make the determination of whether the memory space for holding pointers to transmit commands for the connection is full upon receiving a third command, fourth command or other subsequent command, instead of upon receiving the second command.

For the case in which the interface device waits for ACKs associated with the first command to be returned to send a command complete response to the host 230, upon receiving an ACK indicating that all the data has been received 238, the interface device then sends a command complete response to the host 240. Should the interface device not receive such an ACK within a predetermined time period 242, indicating an error condition, control of the connection is flushed from the interface device to the host 244. The host may then attempt to retransmit 246 the data corresponding to the first command.

For the case in which the interface device has sent a response to the first command indicating that the data associated with the first command has been transmitted, the interface device can send an indication to the host when a corresponding ACK has been received 248. Upon receiving an indication from the interface device that all the data corresponding to the first command has been received, the host then completes the first command 250 by indicating to a layer above the transport layer that the data associated with the first command has been received. Should the interface device not receive such an ACK within a predetermined time period 242, indicating an error condition, control of the connection is flushed from the interface device to the host 244. The host may then attempt to retransmit 246 the data corresponding to the first command.

Alternatively, the SND_UNA value can be provided with each command response, making unnecessary a separate indication that all the data corresponding to a command has been ACKed. The indication that all the data for a command has been ACKed may be piggybacked with a command response indicating that all the data for a subsequent command has been transmitted, or with a command response indicating that all the data for a subsequent command has been ACKed. Once the command count on the interface device is no longer full, the interface device reverts to completing commands to the host when an ACK for all the command data has been received.

For a connection that is flushed from the interface device to the host, the SND_UNA value in the latest command response, which can be provided as part of the flush mechanism, can be used by the host to determine the data of the command that the host needs to transmit.

In this embodiment commands to transmit data are completed by the interface device unless the interface memory for storing the transmit command pointers becomes full or nearly full, at which time the earliest outstanding command is sent to the host for completion. This mechanism has an advantage of maintaining a flow of command completions upon which to piggyback indications that ACKs have been received by the interface device. For an alternative embodiment that always sends a command response indicating data has been sent but not necessarily received, a situation may exist in which a command response may not be available for piggybacking an ACK indication, and that indication is sent in a separate communication from the host to the interface device.

Source code description of an embodiment of the present invention can be found in Provisional Patent Application No. 60/374,788, which is incorporated by reference herein. Also included with the present disclosure is a compact disc including host code and device microcode that describe in detail an embodiment of the present invention.

Although we have focused on teaching the preferred embodiments of an improved data communication system, other embodiments and modifications of this invention will be apparent to persons of ordinary skill in the art in view of these teachings. Therefore, this invention is limited only by the following claims, which include all such embodiments and modifications when viewed in conjunction with the above specification and accompanying drawings.

The invention claimed is:

1. A method for communication involving a computer, a network, and a device that is coupled between the computer and the network, the method comprising:
    sending, from the computer to the device, a command to transmit application data from the computer to the network;
    sending, by the device to the network, data corresponding to the command, including prepending a network or transport layer header to at least some of the data; and
    sending, from the device to the computer, a response to the command indicating that the data has been sent from the device to the network, prior to receiving, by the device from the network, an acknowledgement (ACK) that all the data corresponding to the command has been received.

2. The method of claim 1, wherein sending the response to the command is prompted by sending, from the computer to the device, a subsequent command to transmit. additional application data from the computer to the network.

3. The method of claim 1, further comprising sending a sequence number for the ACK with the response to the command.

4. The method of claim 1, further comprising:
    sending, from the computer to the device, a subsequent command to transmit additional application data from the computer to the network; and
    sending, from the device to the computer, a command response after receiving, by the device from the network, an ACK for all the additional data.

5. The method of claim 1, further comprising:
    sending, from the computer to the device, a subsequent command to transmit additional application data from the computer to the network; and sending, from the device to the computer, information indicating completion of the subsequent command after receiving, by the device from the network, an ACK for all the additional data.

6. The method of claim 1, further comprising:
receiving, by the device, the ACK;
sending, from the device to the computer, an indication that the ACK has been received; and
completing, by the computer and in response to receiving the indication, the command.

7. The method of claim 1, further comprising maintaining, by the computer, a table of ACK values including a value that corresponds to the ACK.

8. The method of claim 1, further comprising:
calculating, by the computer, a sequence number corresponding to the ACK; and
completing the command by the computer, in response to receiving an indication from the device that the ACK has been received by the device.

9. The method of claim 1, further comprising:
receiving, by the computer, the response to the command; and
sending a subsequent command to transmit additional application data from the computer to the network, the subsequent command being sent from the computer to the device and prompted by receiving the response to the command.

10. The method of claim 1, further comprising:
storing a pointer to the command in a memory space of the device; and
freeing the memory space upon sending, from the device to the computer, the command response indicating that the data has been sent from the device to the network.

11. The method of claim 1, wherein sending a command to transmit data includes sending, from the computer to the device, a pointer to the command.

12. The method of claim 1, further comprising sending, with the response to the command, a sequence number beyond which previous data has not been acknowledged (ACKed).

13. The method of claim 1, further comprising sending, with the response to the command, an indication that all data has been received for a previous command.

14. The method of claim 1, further comprising maintaining, by the device, a Transport Control Protocol (TCP) connection that the command, the data and the ACK correspond to.

15. A method for communication involving a computer, a network, and a device that is coupled between the computer and the network, the method comprising:
sending, from the computer to the device; a pointer to a command to transmit data from the computer to the network;
sending, by the device to the network, data corresponding to the command; and
sending, from the device to the computer, a response to the command indicating that the data has been sent from the device to the network, prior to receiving, by the device from the network, an acknowledgement (ACK) that all the data has been received.

16. The method of claim 15, wherein sending the response to the command is prompted by sending, from the computer to the device, a subsequent pointer to a subsequent command to transmit additional application data from the computer to the network.

17. The method of claim 15, further comprising sending a sequence number for the ACK with the response to the command.

18. The method of claim 15, further comprising:
sending, from the computer to the device, a subsequent pointer to a subsequent command to transmit additional application data from the computer to the network; and
sending, from the device to the computer, a command response after receiving, by the device from the network, an ACK for the additional data.

19. The method of claim 15, further comprising:
sending, from the computer to the device, a subsequent pointer to a subsequent command to transmit additional application data from the computer to the network; and
sending, from the device to the computer, information indicating completion of the subsequent command after receiving, by the device from the network, an ACK for the additional data.

20. The method of claim 15, further comprising:
receiving, by the device, the ACK;
sending, from the device to the computer, an indication that the ACK has been received; and
completing, by the computer and in response to receiving the indication, the command.

21. The method of claim 15, further comprising maintaining, by the computer, a table of ACK values including a value that corresponds to the ACK.

22. The method of claim 15, further comprising:
calculating, by the computer, a sequence number corresponding to the ACK; and
completing the command by the computer, in response to receiving an indication from the device that the ACK has been received by the device.

23. The method of claim 15, further comprising:
receiving, by the computer, the command response from the device; and
sending a subsequent pointer to a subsequent command to transmit additional application data from the computer to the network, the subsequent pointer being sent from the computer to the device and prompted by receiving the command response.

24. The method of claim 15, further comprising:
storing the pointer to the command in a memory space of the device; and
freeing the memory space upon sending, from the device to the computer, the command response indicating that the data has been sent from the device to the network.

25. The method of claim 15, further comprising determining that a memory space of the device in which the pointer is stored is full, prior to sending the response to the command.

26. The method of claim 15, further comprising sending, with the response to the command, a sequence number beyond which previous data has not been acknowledged (ACKed).

27. The method of claim 15, further comprising sending, with the response to the command, an indication that all data has been received for a previous command.

28. The method of claim 15, further comprising maintaining, by the device, a Transport Control Protocol (TCP) connection that the command, the data and the ACK correspond to.

29. A method for communication involving a computer, a network, and a device that is coupled between the computer and the network, the method comprising:
sending, from the computer to the device, a series of commands to transmit application data from the computer to the network;

sending, by the device to the network, data corresponding to the commands, including prepending a network or transport layer header to at least some of the data; and sending, from the device to the computer, a response to the commands, each response including a sequence number beyond which the data has not been acknowledged (ACKed);

wherein data corresponding to one of the commands is sent by the device to the network prior to receiving an ACK for data corresponding to a prior one of the commands.

30. A system for communication involving a computer, a network, and a device that is coupled between the computer and the network, the system comprising:

means for sending, from the computer to the device, a command to transmit data from the computer to the network;

means for sending, by the device to the network, data corresponding to the command, including means for prepending a network or transport layer header to at least some of the data; and means for sending, from the device to the computer, an indication that the data has been sent from the device to the network, prior to receiving, by the device from the network, an acknowledgement (ACK) that the data has been received.

31. A data structure for use with a host that is connected to a network by a device, the data structure stored on at least one computer readable medium of the host and device, the data structure comprising:

instructions to send, from the host to the device, a command to transmit data from the host to the network;

instructions to send, from the device to the network, data corresponding to the command, including instructions for prepending a network or transport layer header to at least some of the data; and instructions to send, from the device to the host, an indication that the data has been sent from the device to the network, prior to receiving, by the device from the network, an acknowledgement (ACK) that the data has been received.

* * * * *

UNITED STATES PATENT AND TRADEMARK OFFICE
CERTIFICATE OF CORRECTION

PATENT NO. : 7,543,087 B2 Page 1 of 1
APPLICATION NO. : 10/413256
DATED : June 2, 2009
INVENTOR(S) : Clive M. Philbrick et al.

It is certified that error appears in the above-identified patent and that said Letters Patent is hereby corrected as shown below:

Column 6, line 52, the "." after the word transmit should be deleted.

Column 7, line 53, the ";" after the word device should be changed to a -- , --.

Signed and Sealed this

Twenty-second Day of June, 2010

David J. Kappos
*Director of the United States Patent and Trademark Office*